United States Patent
Feustel

(10) Patent No.: US 6,430,452 B1
(45) Date of Patent: Aug. 6, 2002

(54) CONTROL CIRCUIT FOR REGULATING AT LEAST TWO CONTROLLED VARIABLES

(75) Inventor: Hans-Peter Feustel, Waldstrasse (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/284,508

(22) PCT Filed: Oct. 15, 1997

(86) PCT No.: PCT/EP97/06378
§ 371 (c)(1),
(2), (4) Date: Jun. 14, 1999

(87) PCT Pub. No.: WO98/16879
PCT Pub. Date: Apr. 23, 1998

(30) Foreign Application Priority Data

Oct. 15, 1996 (DE) .......................................... 196 42 443

(51) Int. Cl.[7] .............................................. G05B 13/02
(52) U.S. Cl. .............................. 700/37; 700/28; 700/20; 700/34; 700/45; 318/561; 318/565; 318/568.15; 318/619
(58) Field of Search ........................ 700/4, 2, 3, 19–20, 700/28–31, 34–37, 44–47; 318/561, 565, 568.13, 568.15, 606, 608, 607, 610, 619, 616, 617, 618

(56) References Cited

U.S. PATENT DOCUMENTS 4,647,873 A * 3/1987 Beckner et al. ................. 331/4
4,912,624 A * 3/1990 Harth et al. ................... 700/46
5,291,391 A * 3/1994 Mead et al. .................... 700/46
5,392,598 A * 2/1995 White et al. ................... 60/274
5,394,322 A * 2/1995 Hansen ......................... 700/37
5,486,996 A * 1/1996 Samad et al. .................. 700/32
6,011,708 A * 1/2000 Doht et al. .................... 363/98

FOREIGN PATENT DOCUMENTS

EP 0 057 477 A2 8/1982
GB 2 151 820 A 7/1985

* cited by examiner

Primary Examiner—Ramesh Patel
(74) Attorney, Agent, or Firm—Sughrue Mion, PLLC

(57) ABSTRACT

A method and circuit for controlling a controlled variable by a closed-loop control circuit comprising at least two controllers and a control device with a reference stage and a controlled system generating the controlled variable. The reference stage is supplied with a reference variable, which determines the set point of the controlled variable, the maximum value of which is predefined as a function of the control limits of the control device formed as the sum of the control limits of the controllers of the control device. A first controller of the control device is provided with a control deviation, which is formed as the difference between the reference variable and the actual value of the controlled variable. The other controllers of the control device are provided with a control deviation, which is formed, respectively, as the difference between the control deviation of the respective preceding controller and the actual value of the controlled variable of the additional controller.

4 Claims, 2 Drawing Sheets

CONTROL CIRCUIT FOR REGULATING AT LEAST TWO CONTROLLED VARIABLES

In many applications, instead of unidirectionally acting controls, feedback control methods are being used with increasing frequency, e.g. in the automotive sector, as a control method for safety-relevant functions in particular (transmission, clutch, ABS, airbags etc.) or for comfort functions (automatic windows, sunroofs, automatic stopping systems etc.). In one control mode, by means of a feedback control circuit consisting of a control system that influences the control mode and a controlled system that effects the feedback, the actual value of a controlled variable (the physical variable to be controlled) is compared with the specified setpoint of the controlled variable, and a difference between the setpoint and the actual value (the deviation or the system deviation as a negative deviation) is minimized by means of a manipulated variable that acts on the controlled variable. The setpoint of the controlled variable (the specified setpoint) can be varied by means of a reference variable that is fed to the closed-loop control system.

Depending on the desired application of the control mode, the control system can be realized by means of various controllers which, when there is a system deviation or control deviation, affect one of a number of different control modes. For example, there are proportional controllers, integral controllers, differential controllers, linear controllers or step switches. To reduce the load on the control system, the control system can be constructed from a plurality of controllers that are normally realized in the form of step switches and are activated and deactivated by switching processes, for example. One disadvantage of such systems is the restricted range of action of the various regulators (in particular when step switches are used), i.e. the transition between the control ranges of the controller is not clearly defined. The result is that there are disruptions in the control or the control mode (occurrence of dead areas, overlaps, hysteresis, undefined conditions etc.) and EMC problems that require expensive components to reduce.

The object of the invention is to create a simple control circuit as described in the introduction to claim 1, in which these disadvantages are eliminated, and which has characteristics that are advantageous compared to the prior art.

The invention teaches that this object can be accomplished by the features disclosed in the characterizing portion of claim 1.

In the control circuit taught by the invention, the maximum value of the reference variables that determine the setpoint of the controlled variable (the setpoint) is determined on the basis of the control limits of the individual cascaded controllers of the control circuit connected in parallel, by determining the maximum value of the reference variable by the sum of the control limits of the controller of the control circuit. The reference variable is fed differently to the individual controllers of the control system, so that the controllers of the control [system] circuit are transmitted by different setpoints of the controlled variable, or different control deviations generated on the basis of the setpoint and the actual value. The reference variable is used as the setpoint for the formation of the control deviation for a first controller, and for the additional controllers, the control deviation of the respective preceding controller is used, i.e. for the second controller the control deviation of the first controller, for the third controller the control deviation of the second controller, etc. in this manner, as the setpoint for the second controller, the reference variable minus the actual value of the controller variable of the first controller is used. For the setpoint of the third controller, the reference variable minus the actual values of the controlled variable of the first controller minus the actual value of the controlled variable of the second controller is used, etc. Accordingly, the resulting control, deviation which is transmitted to the respective controller of the control system, is the difference between this specified setpoint and the actual value of the controlled variable of the respective controller.

The cascaded controllers connected in parallel of the control system are successively activated on the basis of this specification of different setpoints or the control deviations thereby formed.

When a reference value increases from zero (setpoint for the controlled variable), first only the first controller is activated; the second controller is deactivated, because for it, as the setpoint, the control deviation (reduced to zero) of the first controller is specified. Likewise, the additional controllers, if any, are deactivated, because a control deviation occurs in the second controller and in none of the subsequent controllers. The first controller controls the controlled variable according to the specification by the reference variable by itself, until its control limit has been reached (i.e. until it is deactivated or "saturated"). In the event of a further increase of the reference variable (the setpoint for the controlled variable), the first controller can no longer respond to this setpoint command (i.e. it can no longer control the controlled variable), and thus a control deviation occurs. The second controller which has just received this setpoint in the form of a control deviation is therefore "activated" and takes over the portion of the controlled variable that can no longer be controlled by the first controller (the additional controllers present, if any, are then deactivated, because the control deviation of the second controller is zero). In the event of a further increase of the reference variable (the setpoint for the controlled variable), the second controller ultimately also reaches its control limit. As a result of the control deviation on the second controller that also occurs (which corresponds to the setpoint command for the formation of the control deviation for the third controller), the third controller is consequently activated, and takes over the portion of the controlled variable that can no longer be controlled by the second controller. In the event of a ether increase in the reference variable (the setpoint command for the controlled variable), the additional controllers of the control circuit are activated successively, and in an analogous manner take over the portion of the controlled variable that can no longer be controlled by the preceding controllers (for the final controller of the control system, the setpoint confound for the generation of its control deviation is the control deviation of the penultimate controller). In this manner, the controlled variable can be controlled continuously up to its maximum value determined by the maximum value of the reference variable, because the control limit of the final controller of the control circuit is reached at the maximum value of the controlled variable.

To specify the different setpoints, and thus to generate the different control deviations for the various controllers of the control circuit, a comparison stage with a plurality of comparison elements can be provided. Each controller is thereby associated with a comparison element to generate the respective control deviation, to which the actual value of the controlled variable of the respective controller and the different specified setpoint are fed.

The controllers of the control circuit can preferably be realized in the form or linear controllers which have a continuous control mode up to their control limit.

The advantages of the control circuit are that;

Any desired controllers with different control limits and different control responses can be used as the controllers of the control circuit.

As a result of the setpoint specification of the additional controllers of the control circuit, which can be selected as the control deviation of the respective preceding controllers the control is totally independent of tolerances of components of the control circuit, the dimensions of the controlled circuit and the value of the power supply voltage of the control circuit.

Only one of the controllers of the control circuit is operated in a controlling operation at a time (the other controllers are deactivated or turned off), so that the control circuit has a low power consumption.

The transition between the various control ranges is continuous. Consequently, there are no switching processes, nor any interference with the control process caused by switching processes (occurrence of dead zones, overlaps, hysteresis, undefined conditions etc.).

EMC (electromagnetic compatibility) problems are largely eliminated, so that expensive components are not required to reduce the problems of EMO.

The invention is explained in greater detail below with reference to the exemplary embodiment of a control circuit with a control device that consists of three cascaded linear controllers connected in parallel, and with reference to the embodiment illustrated in the accompanying drawings (FIGS. 1 to 3), in which:

FIG. 1: is a schematic diagram of the control,

Figure 1:
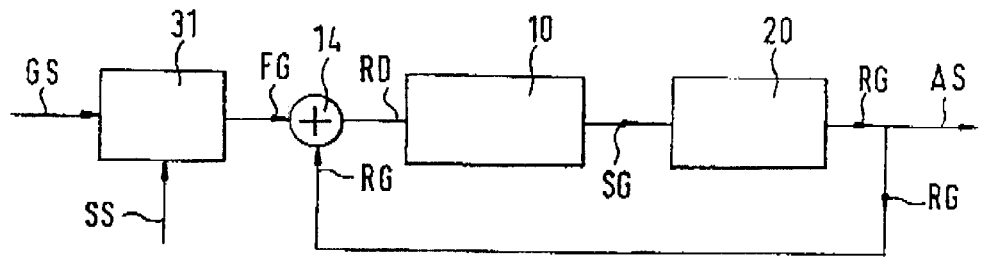

As shown in FIG. 1, inside a control circuit 1 consisting of a control device 10, controlled system 20 and the setpoint device 31, the controlled variable RG is controlled by means of a manipulated variable 5G. The setpoint device 31 (which can be activated and deactivated by the control signal SS, for example), the reference variable FG is generated (for example by means of an externally introduced control signal GS), and this reference value FG is fed as the setpoint of the controlled variable RG to the comparison stage 14. In the comparison stage 14, the reference variable FG is compared as the setpoint of the controlled variable RG with the actual value of the controlled variable RG (from feedback), and on the basis of this comparison the control deviation RD is formed. This control deviation RD is transmitted to the control device 10, and the manipulated variable SG is generated by this control device 10. By means of the manipulated variable SG, the controlled system 20 is actuated, and the controlled system 20 generates a certain actual value of the manipulated variable RG. This actual value of the controlled variable RG is output on one hand at the output of the control loop 1 as the output variable AS, and on the other hand into a feedback loop of the control loop 1 of the comparison stage 14.

Figure 2:
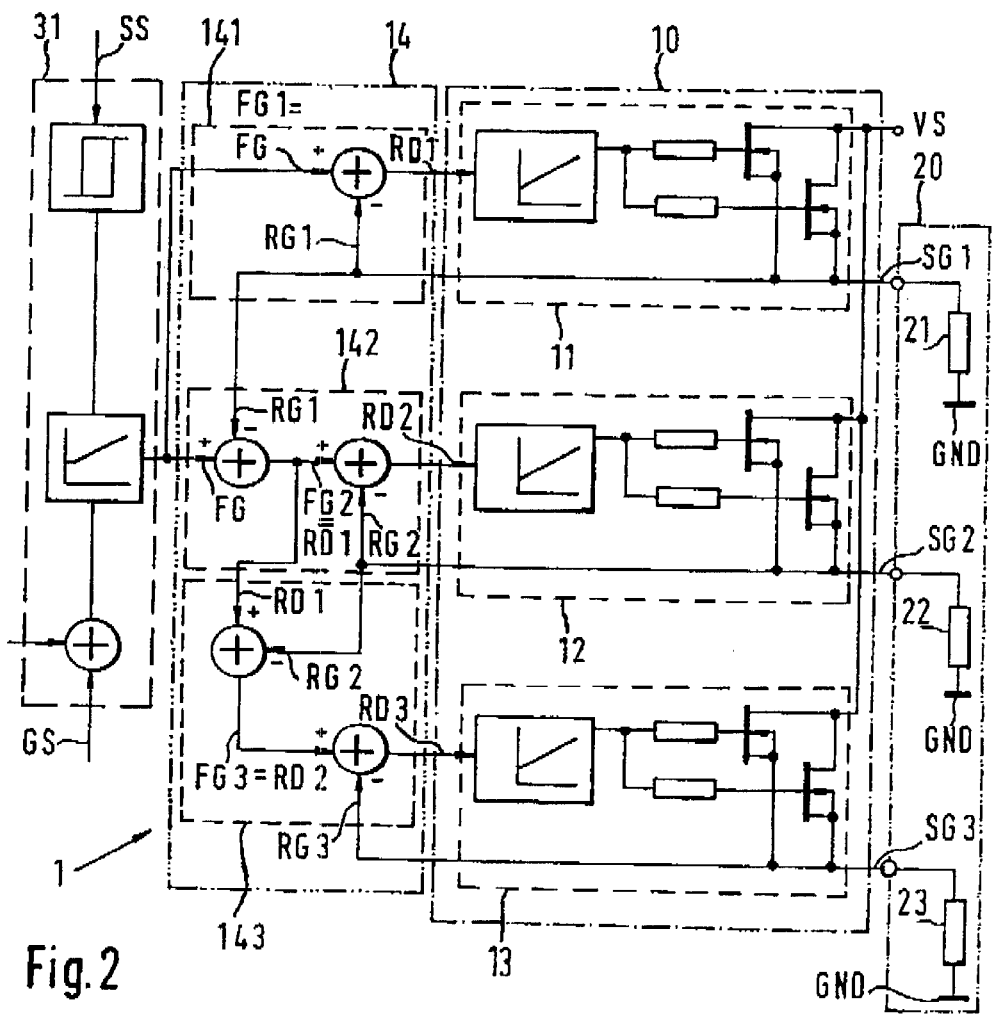
FIG. 2 is a detail diagram of a control circuit according to the invention.

As illustrated in FIG. 2, the inventive controlled system 20 is realized in the form of three control elements 21, 22, 23 connected in parallel, which are realized, for example, in the form of resistances, and are switched between the power supply voltage (e.g. +12 V) and reference potential (in this case, the manipulated variable SG and the controlled variable RG are identical). On the control system 10 realized by means of the three linear controllers 11, 12, 13 connected in parallel, each output of a linear controller 11,12, 13 is connected with the input of one of the control elements 21, 22, 23, which consequently each receive a defined manipulated variable SG1, SG2, SG3. The feedback controlled variables RG1, RG2, RG3 of the linear controllers 11, 12, 13 arc compared by means of the comparison stages 14 consisting of the three comparison elements 141,142,143 with the respective setpoint of the controlled variable RG, so that each linear controller 11,12,13 has a different control range (the comparison stage 14 with the comparison clememts 141,142,143 can also be realized as part of the control system 10). As a result of the special configuration of the comparison elements 141,142,143 of the comparison stage 14, the linear controllers 11, 12, 13 of the control system 10 receive different control deviations RD1, RD2, RD3 generated on the basis of the difference between the respective reference variables FG1, FG2, FG3 (setpoint) and the respective controlled variables RG1, RG2, RG3 (Actual value):

The first linear controller 11 receives the control deviation RD1 as the difference between the reference variable FG as reference variable FG1 and the actual value RG1 of the controlled variable RG of the first linear controller 11, The second linear controller 12 receives the control deviation RD2 as the difference between the control deviation RD1 of the first linear controller 11 as the reference variable FG2 (Reference variable FG minus actual value RD1 of the controlled variable RG1 of the first linear controller 11) and the actual value RG2 of the controlled variable RG of the second linear controller 12, The third linear controller 13 receives the control deviation RD3 as the difference between the control deviation RD2 of the second linear controller 12 as reference variable FG3 (reference variable FG minus the actual value RD1 of the controlled variable RG of the first linear controller 11 minus the actual value RG2 of the controlled variable RG of the second linear controller 12) and the actual value RG3 of the controlled variable RG of the third linear controller 13.

The maximum value of the controlled variable FG is specified on the basis of the sum of the control limits of the individual linear controllers 11, 12, 13 and thus on the basis of the maximum value of the controlled variable RG. The reference variable FG is varied by means of the setpoint device 31, e.g. as a function of the externally supplied control signal GS. By means of a control signal SS applied to the setpoint device 31, the control loop 1 is turned on or off (the control is activated or deactivated).

Figure 3:
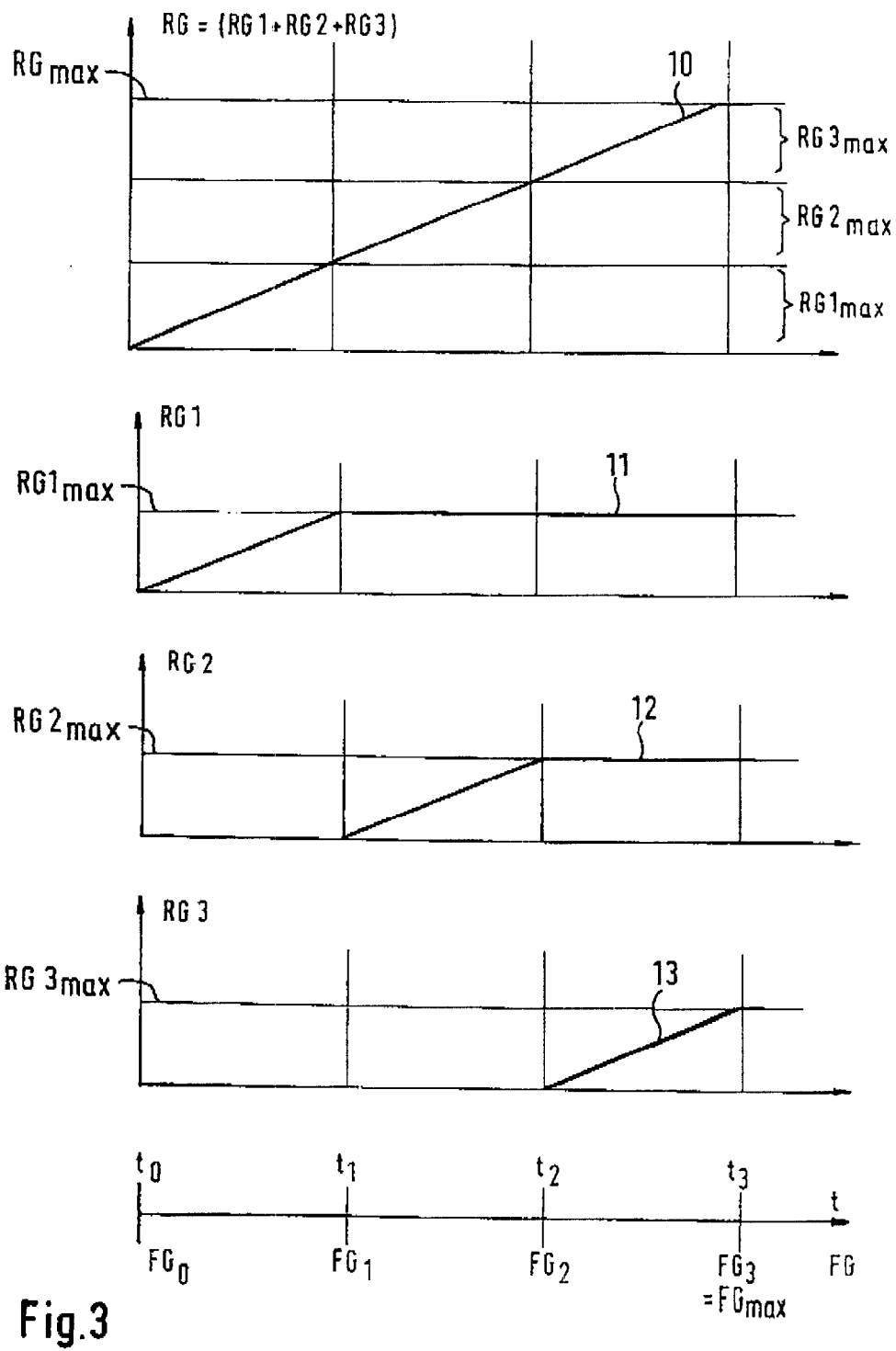
FIG. 3 is a diagram illustrating the control response.

FIG. 3 shows the chronological sequence of the controlled variables RG1, RG2, RG3 of the individual linear controllers 11, 12, 13 of the control system 10, and the chronological sequence of the controlled variable RG (overall control sequence) of the control system 10, during a continuous increase of the reference variable FG beginning at zero and up to its maximum value $FG_{max}$.

On the basis of the specified different control deviations RD1, RD2, RD3, the cascaded linear controllers 11, 12, 13 connected in parallel of the control system 10 are activated successively during this continuous increase, and thereby also define successively the curve of the controlled variable RG (RG=RG1+RG2+RG3) formed as the sum of the controlled variables RG1, RG2, RG3 of the linear controllers 11, 12, 13:

at the point $t_0$ (which is where the reference variable FG reaches the threshold $FG_0$), the first linear controller 11 is activated;

when there is an increase in the reference variable FG (the reference variable FG exceeds the threshold $FG_0$), the overall control curve (the controlled variable RG) is defined only by the first linear controller 11 (controlled variable RG1); the second linear controller 12 and the third linear controller 13 are deactivated, because the control deviation RD1 of the first linear controller 11 is zero;

at the time $t_1$ (which is where the reference variable FG reaches the value $FG_1$), the control limit $RG1_{max}$ of the first linear controller 11 is reached (the maximum value RG1max of the controlled variable RG1 of the first linear controller 11) and the first linear controller 11 is turned off; consequently the second linear controller 12 is activated;

as the reference variable FG increases (the reference variable FG exceeds the value FG1), the control deviation RD1 of the first linear controller 11 becomes different from zero, and therefore the overall control curve (the controlled variable RG) of the first linear controller 11 (controlled variable RG1) and of the second linear controller 12 (controlled variable RG2) is determined (the second linear controller 12 takes over the portion of the controlled variable RG1 that can no longer be controlled by the first linear controller 11); the third linear controller 13 is deactivated, because the control deviation RD2 of the second linear controller 12 is zero.

at the time $t_2$ (which is where the reference variable FG reaches the value FG2), the control limit $RG2_{max}$ of the second linear controller 12 is reached (the maximum value $RG2_{max}$ of the controlled variable RG2 of the second linear controller 12) and the second linear controller 12 is turned off; consequently, the third linear controller 13 is activated;

as the reference variable FG increases (the reference variable FG exceeds the value FG2), the control deviation RD2 of the second linear controller 12 becomes different from zero, and therefore the overall control curve (the controlled variable RG) is determined by the first linear controller 11 (controlled variable RG1, by the second linear controller 12 (controlled variable RG2) and by the third linear controller 13 (controlled variable RG3) (the third linear controller 13 takes over from the first linear controller 11 the portion of the controlled variable RG it can no longer control, and from the second linear controller 12 the portion of the controlled variable RG it can no longer control);

at the time $t_3$ (which is when the reference variable FG reaches the value $FG_3$ or its maximum value $FG_{max}$), the control limit $RG3_{max}$ of the third linear controller is reached (the maximum value $RG3_{max}$ of the controlled variable RG3 of the third linear controller 13) and thus also the control limit $RG_{max}$ of the control system 10 (the maximum value $RG_{max}$ of the controlled variable RG).

As illustrated in FIG. 3, at any one time, only one of the linear controllers 11, 12, 13 of the control system 10 is operated in linear operation, so that in the event of a variation of the reference variable FG, there is a continuous control of the controlled variable RG without any irregularities (hysteresis, sudden jumps), dead zones or overlaps.

The values FG1, FG2 and FG3 of the reference variable FG are a function of the design and/or construction of the respective controller, and are determined so that the controller which has been active up to that point can no longer respond to its specified setpoint (i.e. it has reached its control limit).

I claim:

1. A closed-loop control circuit for controlling at least two controlled variables which are generated by a corresponding number of controlled systems, the closed-loop control circuit comprising at least two controllers which control one controlled variable of the at least two controlled variables, respectively, the at least two controllers being interconnected in the closed-loop control circuit, wherein a) each of the at least two controllers is configured to be provided with a control deviation which equals the difference between a set point and an actual value of the one controlled variable of the respective controller, b) a first controller of the at least two controllers is configured to be supplied with a reference variable as a set point, wherein the maximum value of the reference variable equals the sum of upper control limits of the at least two controllers, and c) a second controller of the at least two controllers is configured to be supplied with a control deviation provided to the first controller as a set point.

2. A control circuit as claimed in claim 1, wherein said controllers comprise linear controllers.

3. A control circuit as claimed in claim 1, further comprising a comparison element associated with each of said controllers for generating the control deviation of the respective controller.

4. A control circuit as claimed in claim 1, further comprising a third controller, wherein the third controller is configured to be supplied with a control deviation provided to the second controllers as a set point.

* * * * *